United States Patent [19]

Yamada et al.

[11] Patent Number: 4,575,210
[45] Date of Patent: Mar. 11, 1986

[54] AUTOMATIC FOCUSING DEVICE

[75] Inventors: Masashi Yamada; Kenichi Iwaida, both of Hachioji, Japan

[73] Assignee: Konishiroku Photo Industry Co., Ltd., Tokyo, Japan

[21] Appl. No.: 692,682

[22] Filed: Jan. 18, 1985

[30] Foreign Application Priority Data

Jan. 27, 1984 [JP] Japan .................................. 59-14140

[51] Int. Cl.⁴ .............................................. G03B 3/10
[52] U.S. Cl. .................................................. 354/400
[58] Field of Search ............ 354/400, 401, 402, 195.1; 350/255, 429, 430

[56] References Cited

U.S. PATENT DOCUMENTS 4,319,820  3/1982  Ostrowski et al. ............... 354/195.1

Primary Examiner—William B. Perkey
Attorney, Agent, or Firm—Frishauf, Holtz, Goodman & Woodward

[57] ABSTRACT

An automatic focusing device comprises a motor operated by a range signal, a lens moving system in which a lens is moved by the motor, a clutch for engaging and disengaging the motor from the lens moving system and a power switch for the motor. A switchover member is provided which is selectively settable to a manual mode, and auto-focus mode and a focus-lock mode. The modes are changed over by a combination of an engagement or disengagement of the clutch by the switchover member and a switchover of the power switch (between ON and OFF) by the switchover member.

15 Claims, 8 Drawing Figures (I) (II)

AUTOMATIC FOCUSING DEVICE

BACKGROUND OF THE INVENTION

1. Field of the Invention

This invention relates to an automatic focusing device.

2. Description of the Prior Art

Conventional automatic focusing devices have been provided with a mechanism capable of enforcing a manual focusing operation even in the course of an automatic focusing operation.

In such devices, however, there have so far been restrictions such as that a slipping mechanism has been required and a high-torque motor has also been required. These restrictions have led to increases in parts, the torque controls of the slipping mechanism, the manufacturing cost of such devices and the like.

OBJECTS OF THE INVENTION

According to this invention, the above-mentioned disadvantages and problems can be resolved.

It is a general object of the invention to provide an automatic focusing device in which losses of motor torque caused during torque transmission are reduced by not providing a slipping mechanism, and the device itself is miniaturized by use of a simple mechanism, and further the cost thereof can be reduced.

SUMMARY OF THE INVENTION

This invention is so constituted that a switchover member is provided to switch over the power switch of a motor operated with a range signal and to engage or disengage a clutch interposed in a power-transmission system between the motor and a lens movement system, and that a lens only can be moved manually by separating the motor from the lens movement system, and further that a focusing operation can be locked by engaging the motor with the lens movement system while the motor is stopped in motion.

EFFECTS OF THE INVENTION

An automatic focusing device relating to this invention is characterized by providing a switchover member capable of switching over the power switch of a motor operated with a range signal and engaging or disengaging a clutch interposed in a power-transmission system between the motor and a lens movement system. It is, therefore, possible to display the excellent effects that the mechanical construction thereof is relatively simple and a changeover of an automatic focusing photographing to and from a manual photographing as well as a focus-lock photographing can simply be performed by only an operation of the switchover member, and in addition that the losses of motor torque the in course of transmission can be reduced and the device itself can also be miniaturized and the cost thereof can further be reduced, because such a slipping mechanism as used in the conventional devices is not used.

DESCRIPTION OF THE PREFERRED EMBODIMENTS

Figure 1:
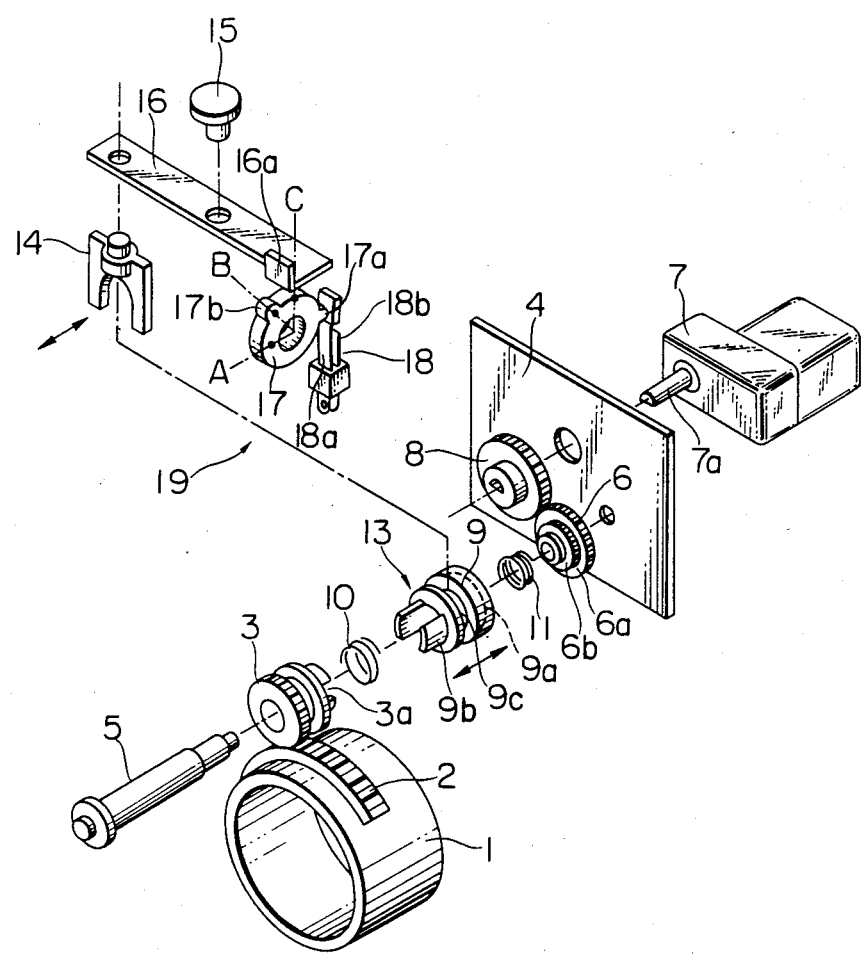
FIG. 1 is a perspective view of the breakdown of the embodiment.
Figure 2:
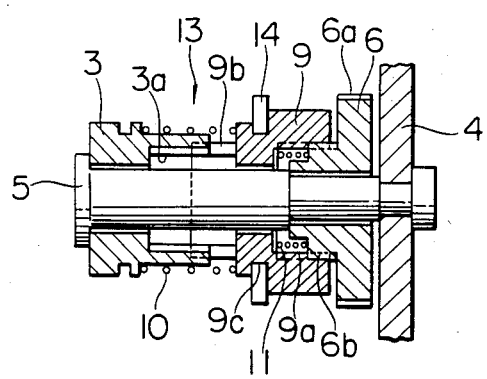
FIG. 2 is an enlarged cross-sectional view of the clutch mechanism.

A preferred embodiment of this invention will now be described by way of example and with reference to the accompanying drawings.

Reference numeral 1 is a lens barrel which is rotated by the rotation of driving gear 3 engaged with gear 2 formed on the circumferential surface of lens barrel 1 and which constitutes a lens movement which moves a taking lens (not shown) back and forth according to the directions of the rotation of drive gear 3 being loose-fitted to gear shaft 5 of which base end is fixed to base plate 4. To the base end of gear shaft 5 is loosely fitted a stepped gear wheel 6. The large sized gear 6a of stepped gear wheel 6 is engaged with drive gear 8 fixed, on the front side of base plate 4, to shaft 7a of motor 7 revolving regularly and reversely according to a received range signal, that is, a signal for driving the motor to move a lens system to a certain position according to a distance to a subject. 9 is an idle gear loose-fitted slidably in the axial direction to gear shaft 5 located between the above-mentioned stepped gear wheel 6 and drive gear 3. This idle gear 9 is equipped with an internal gear 9a on the rear side thereof so as to engage with small sized gear 6b of stepped gear wheel 6 and is also equipped with a protrusion 9b capable of engaging slidebly in the axial direction with a hollow 3a provided on the back of the drive gear 3. 10 is a first spring interposed between drive gear 3 and idle gear 9. The first spring presses idle gear 9 so as to couple internal gear 9a of idle gear 9 to small sized gear 6b of stepped gear wheel 6. 11 is a second spring interposed betwen idle gear 9 and stepped gear wheel 6 so as to be weaker is spring tension than the first spring, and it serves as a shock-absorber for reducing a force of disengaging idle gear 9 from stepped gear wheel 6. In other words, in a normal condition, idle gear 9 is coupled to stepped gear wheel 6 by the tension of first spring 10 to connect motor 7 to drive gear 3, and on the contrary, when idle gear 9 moves in the direction against the tension of first spring 10, it disengages from stepped gear wheel 6 so as to serve as clutch 13 for disconnecting motor 7 from drive gear 3. This clutch 13 shall not be limited to those using the above-mentioned idle gear 9.

14 is an inverted U-shaped pressure plate coupled to a hollow groove 9c formed around the circumferential surface of idle gear 9. This pressure plate 14 is rotatably fitted to one end of horizontally rotatable arm plate 16 pivoted about a center with pin 15.

17 is a rotor provided on the circumferential surface thereof with a protrusion 17a for pressing movable contact 18a of power switch of motor 7 so as to bring it into contact with fixed contact 18b, and a protrusion 17b which is caught on bent piece 16a provided to the other end of arm plate 16. The rotor 17 is connected to an operation member (not shown) so that the protrusion 17b may be stopped at three points, A, B and C shown in FIG. 1, respectively. When the rotation of rotor 17 is stopped and protrusion 17b is stopped at A, protrusion 17a disengages upward from pressure point P of movable contact 18a and thereby turns switch 18 OFF. (See FIG. 5-II). When protrusion 17b stops at B, protrusion 17a hits pressure point P of movable contact 18a and turns switch 18 ON. (See FIG. 3-II) Further, when protrusion 17b stops at C, it disengages downward from pressure point P of movable contact 18a and turns switch 18 OFF again. (See FIG. 4-II) That is to say, a range signal instructs to drive motor 7 and motor 7 is then driven when switch 18 is ON. On the other hand, when protrusion 17b of rotor 17 is in the above-mentioned position C, protrusion 17b operates to press backward bent piece 16a provided to the front edge of the other end of the above-mentioned arm plate 16 and to rotate arm plate 16 around pin 15 as shown in FIG. 4-I, and then to let idle gear 9 travel to the left against the tension of first spring 10 through pressure plate 14 provided to one end of the arm plate 16, and further to disengage the coupling from stepped gear wheel 6. Protrusion 17b does not operate bent piece 16a of arm plate 16 when it is in either of positions A or B. Eventually, the above-mentioned rotor 17 serves as switchover member 19 for switching power switch 18 of motor 7 on and off and for engaging and disengaging clutch 13 comprising the above-mentioned idle gear 9. It is needless to say that such switchover member 19 may be constituted in other ways than the above.

Now, the operation of the above-mentioned example will be described.

(1) Auto-focusing photography

Figure 3:
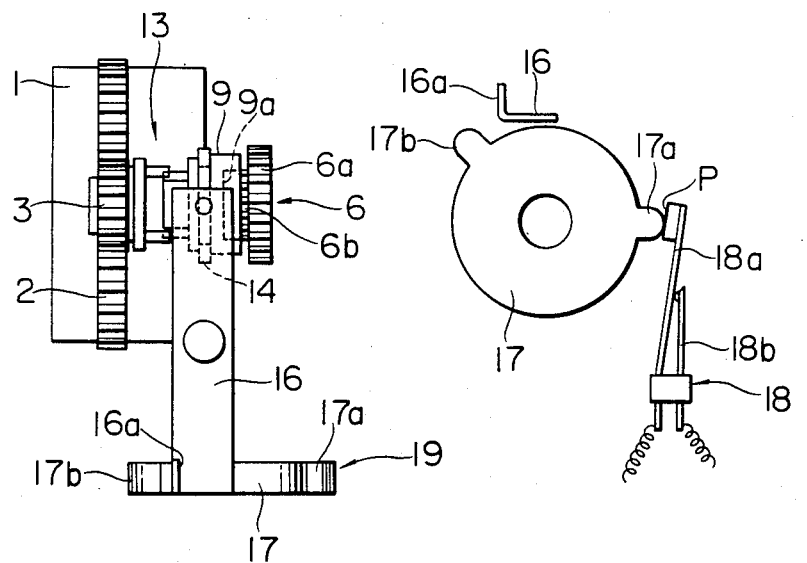
FIGS. 3-I, 3-II are a fragmentary plan view and a side view respectively showing the switchover member operated when automatically focusing.
Figure 4:
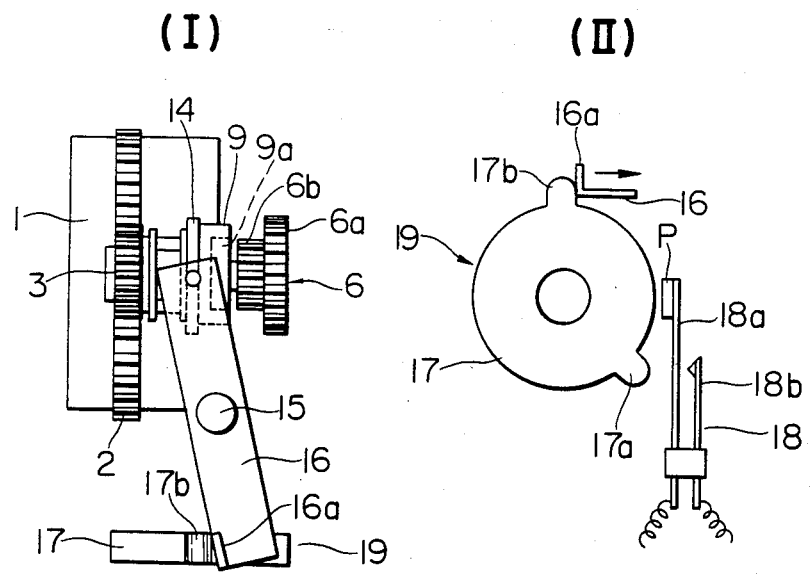
FIGS. 4-I, 4-II are a fragmentary plan view and a side view respectively showing the switchover member operated when manual focusing.

Switchover member 19 is to be set so that protrusion 17b of rotor 17 can be stopped in position B as shown in FIG. 3-II.

In this state, protrusion 17b does not operate bent piece 16a of arm plate 16, and idle gear 9 serving as clutch 13 is kept as it is coupled to small sized gear 6b of stepped gear wheel 6 with the internal gear 9a of the idle gear 9 by the tension of first spring 10. On the other hand, movable contact 18a of power switch 18 of motor 7 is in the ON state being pressed by protrusion 18a of rotor 17, so that a range signal is given from a rangefinder (not shown). When motor 7 is put in operation by the range signal, it rotates drive gear 3 being coupled with hollow 3a to protrusion 9b of the idle gear 9 through an activate gear 8, stepped gear wheel 6 and idle gear 9, and it rotates lens barrel 1 of a lens moving system in a desired direction. Consequently, an auto-focusing photographing can be continued to operate as long as switchover member 19 is in a coupling state.

(2) Manual photography

Switchover member 19 is to be set so that protrusion 17b of rotor 17 can be stopped in position C as shown in FIG. 4-II.

In this state, protrusion 17a disengaged downward from pressure point P of movable contact 18a of switch 18 of motor 7 so as to make switch 18 off. Therefore, even when a range signal is given from a rangefinder (not shown), motor 7 does not operate and an auto-focusing is stopped in function. At the same time, protrusion 17b presses backward bent piece 16a on the other end of arm plate 16 as mentioned before and it rotates the arm plate 16 around pin 15. Accordingly, idle gear 9 is travelled to the left by pressure plate 14 attached to one end of arm plate 16 against the tension of first spring 10, and idle gear 9 is disengaged from stepped gear wheel 6. Consequently, motor 7 is disengaged from drive gear 3 of lens barrel 1 so that lens barrel 1 can be rotated independently by hand.

(3) Auto-focus locking

Figure 5:
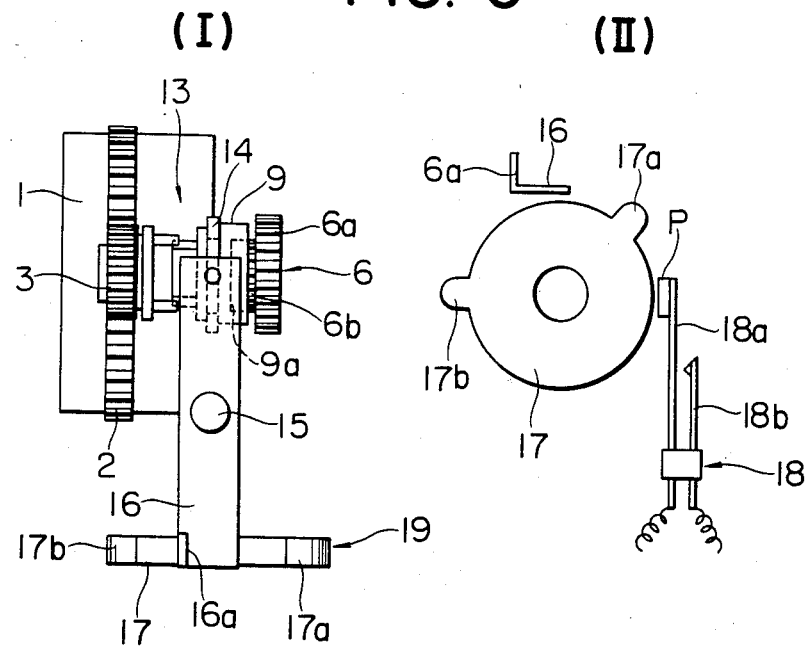
FIGS. 5-I, 5-II are a fragmentary plan view and a side view respectively showing the switchover member operated when a focusing is locked.

Switchover member 19 is to be set so that protrusion 17b of rotor 17 can be stopped in position A as shown in FIG. 5-II.

In this state, protrusion 17a disengages upward from pressure point P of movable contact 18a of switch 18 so as to make switch 18 off. Similar to the case of (1), auto-focusing is stopped in function and protrusion 17b does not operate bent piece 16a of arm plate 16 so as not to move idle gear 9. Therefore, idle gear 9 and stepped gear wheel 6 are kept in a coupling state, so that lens barrel 1 can not almost be rotated.

What is claimed is:

1. A method of changing over the modes of focusing in which a motor is operated responsive to a range signal so as to move a lens moving system, comprising:
    switching a power source of the motor ON and engaging the motor with the lens moving system, for an automatic focusing mode;
    switching the power source of the motor OFF and engaging the motor with the lens moving system, for a focus locking mode; and
    disengaging the motor from the lens moving system, for a manual focusing mode.

2. An automatic focusing device, comprising:
    a motor operated by a range signal;
    a lens moving system in which a lens is moved by said motor;
    a clutch by which said motor is engaged with and disengaged from said lens moving system;
    a power switch for said motor; and
    a switchover member coupled to said clutch and to said power switch, and including means for causing engagement or disengagement of said clutch and for causing a switchover of said power switch, said switchover member being settable to a manual mode, an auto-focus mode and a focus-lock mode, said modes being changed over by a combination of an engagement or disengagement of said clutch by said switchover member and a switchover of said power switch by said switchover member.

3. An automatic focusing device as claimed in claim 2, wherein said switchover member comprises a rotor having a circumferential surface, and a plurality of protrusions on said circumferential surface of said rotor.

4. An automatic focusing device as claimed in claim 3, wherein said power switch comprises a movable contact and a fixed contact.

5. An automatic focusing device as claimed in claim 2,
    comprising a motor driving system coupled to said motor, said motor driving system including a first gear on the side thereof:
    said lens moving system comprising a second gear on the side of said lens moving system, said first and second gears being arranged coaxially; and
    said clutch comprising an idle gear mounted on an axis and which is slidable between said first and second gears in the axial direction of said axis.

6. An automatic focusing device as claimed in claim 5, wherein said idle gear has opposite sides which are respectively energized by respective springs.

7. An automatic focusing device as claimed in claim 2, wherein said switchover member comprises a means for performing an engagement and disengagement of said clutch and a switchover of said power switch at the same time.

8. An automatic focusing device as claimed in claim 3, wherein said switchover member further comprises a pivotable arm plate which is pivoted by each of said protrusions of said rotor according to the rotation thereof, and said clutch is engaged and disengaged by said pivoting of said arm plate.

9. An automatic focusing device as claimed in claim 2, wherein the lens moving system comprises a lens barrel for holding the lens.

10. An automatic focusing device as claimed in claim 2, wherein the lens is a zoom lens.

11. An automatic focusing device as claimed in claim 2, wherein:
in said auto-focus mode, said clutch is engaged and said power switch is rendered ON by said switchover member; and
in said focus-lock mode, said clutch is engaged and said power switch is caused to be in an OFF condition by said switchover member.

12. An automatic focusing device as claimed in claim 2, wherein, in said manual mode, said clutch is disengaged by said switchover member.

13. An automatic focusing device as claimed in claim 2, wherein, in said auto-focus mode, said clutch is engaged and said power switch is engaged by said switchover member.

14. An automatic focusing device, as claimed in claim 2, wherein, in said focus-lock mode, said clutch is engaged and said power switch is caused to be in an OFF condition by said switchover member.

15. An automatic focusing device as claimed in claim 2, wherein:
in said manual mode, said clutch is disengaged by said switchover member; and
in said focus-lock mode, said clutch is engaged and said power switch is caused to be in an OFF condition by said switchover member.

* * * * *